Figure 2:
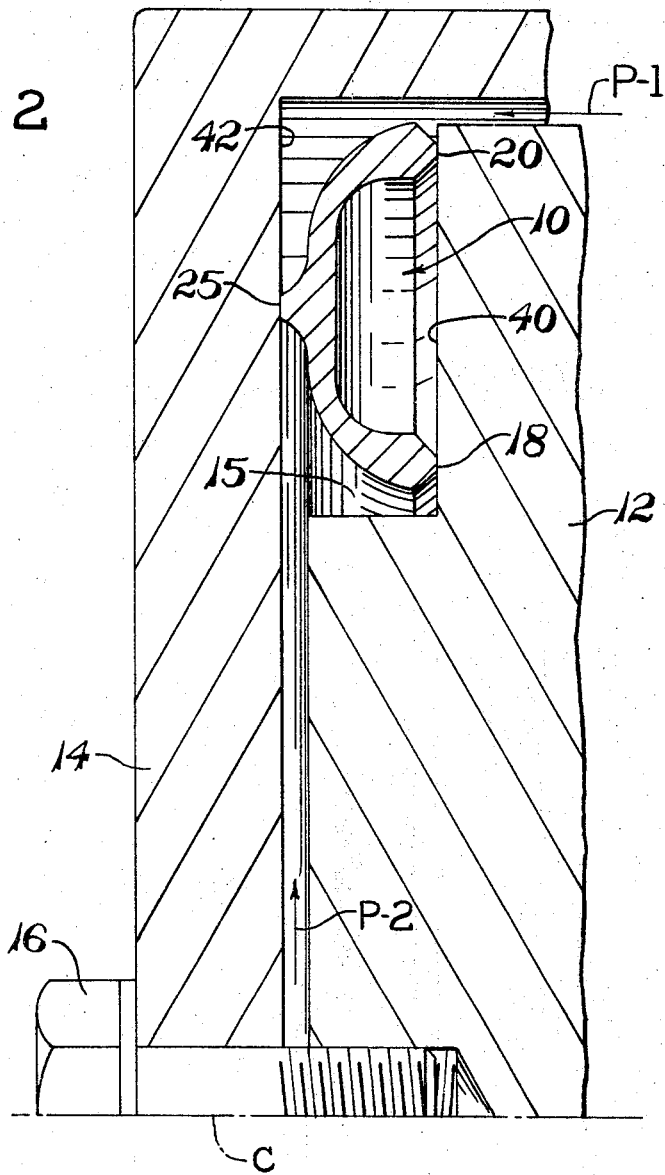

Oct. 3, 1967     L. S. BIALKOWSKI     3,345,078

SEAL ASSEMBLY

Original Filed Feb. 21, 1964

INVENTOR.
LUDWIK S. BIALKOWSKI
BY John D. Haney
ATTY.

United States Patent Office 3,345,078
Patented Oct. 3, 1967

3,345,078
SEAL ASSEMBLY
Ludwik S. Bialkowski, Troy, Ohio, assignor to The B. F. Goodrich Company, New York, N.Y., a corporation of New York
Continuation of application Ser. No. 346,487, Feb. 21, 1964. This application Sept. 19, 1966, Ser. No. 580,509
2 Claims. (Cl. 277—205)

This application is a continuation of application Ser. No. 346,487, filed Feb. 21, 1964, now abandoned.

This invention relates to fluid pressure seals useful in hydraulic or pneumatic equipment between relatively static parts. More particularly, the seals of this invention are gasket-type seals of the class in which a sealing element is statically pressed between two opposing parts.

A seal assembly according to this invention embodies a sealing element which is preferably annular and is specially shaped so that it can seal against fluid pressure directed from two different sources. The seal is effective even if the pressure of the fluid from one source is significantly different from the pressure of the other source. Moreover, the sealing element maintains the fluid sources separated so that the fluids involved may differ from each other and may even be chemically incompatible. The sealing element is preferably of resilient metal.

With respect to its structural characteristics, the sealing element of this invention has a body of generally C-shaped cross section with three independent sealing faces or edges. These edges are preferably very narrow so as to effect practically a line contact with the adjoining parts of the assembly. Two of the sealing edges are located at the extremities of the C-shaped body and are both directed in the same direction to engage a sealing surface of one of the apparatus parts. The third sealing edge is directed oppositely on a region of the body between the extremities to engage a sealing surface of the other apparatus parts. Between the third sealing edge and each of the other two edges the body is curved to present a convex surface to the fluid pressure directed against the sealing element. The concave surface regions of the sealing element are substantially free of fluid pressure because of the sealing engagement of the two edges at the extremities of the C-shaped body.

Figure 1:
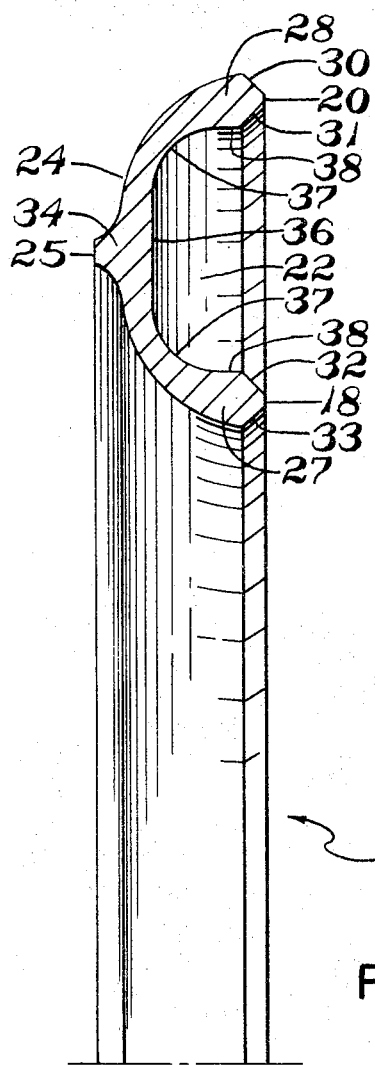

The invention will be further described with reference to the accompanying drawings which show, by way of example, a preferred seal assembly embodying this invention. In the drawings:

FIG. 1 shows a partial axial cross section of a sealing ring of preferred design; and FIG. 2 is a fragmentary axial cross sectional view of a preferred seal assembly embodying the sealing ring of FIG. 1.

The components of the seal assembly in FIG. 2 include an annular metal sealing ring 10 located with two parts 12 and 14 between which the ring 10 is axially squeezed. The parts 12 and 14 represented in the drawing may be any two parts of an apparatus in which fluid pressure is contained. The ring 10 fits in a rabbet 15 in part 12 which is annular about the center line C indicated. Part 14 is forced axially against the ring 10 by bolt 16 threaded into part 12. The assembly is such that the sealing ring 10 is subject to fluid pressure from two different sources indicated by the arrows P-1 and P-2 in FIG. 2. Pressure P-1 may differ significantly from pressure P-2. The fluids in which such pressures are generated may also be different from each other—e.g. the pressure represented by P-1 and P-2 may be fluid presure systems such as oil, water, air, etc. in any combination.

The sealing element or ring 10 is generally thin and is preferably of a resilient alloy steel for ordinary hydraulic equipment. It may be of any metal which has sufficient rigidity, resilience, temperature resistance, and corrosion resistance to meet the particular service conditions.

The sealing ring 10 is in the shape of an annular channel and its cross section is a generally elongated C-shape. The ring has a radially inner sealing edge 18, and a radially outer sealing edge 20 bordering the concave or channel-shaped face 22 of the ring. On the opposite or convex face 24, approximately along the annular midpoint thereof, there is a third sealing edge 25 which is oppositely directed from the other two sealing edges.

Each sealing edge is in a plane normal to the axis of the ring and edges 18 and 20 are in a common plane. Each edge is preferably a polished or coined plane surface, the radial width of which is less than about 0.010 inch wide. Alternatively, these edges may be rounded or they may actually come to a sharp point. Edges of these shapes provide essentially a line contact against the parts 12 and 14 and require comparatively small axial force to make the seal effective. While line contact is preferred, the advantages of this invention may be realized in many cases with sealing edges which are much wider, radially, than the foregoing dimension recommended. Accordingly, this dimension is not to be regarded as a critical or limiting feature unless specifically stated in a claim. The sealing edges in FIGS. 1 and 2 are drawn with a larger area relative to the remaining portions of the ring than is preferred in service to better illustrate the shape of the ring.

Edges 18 and 20 are formed on thick marginal portions 27 and 28, respectively, which are chamfered inside and outside at 30, 31, 32 and 33 toward the sealing edges. Sealing edge 25 is formed on a thick annular ridge 30 on the convex side 24 of the sealing ring.

The convex side 24 of the sealing ring is shaped in a smooth reversely curved contour between the sealing edge 25 and each of the chamfers 30 and 33. The concave side 22 is generally plane in the region 36 opposite ridge 34, and is then curved through the regions 37 concentrically with the outside surface. The latter regions blend smoothly into generally cylindrical regions 38 adjoining chamfers 31 and 32.

In the seal assembly of FIG. 2, the sealing edges 18 and 20 abut a plane sealing surface 40 on part 12 whereas the sealing edge 25 abuts an opposing plane parallel surface 42 on part 14.

The sealing ring is axially squeezed by tightening bolt 16 to urge part 14 toward part 12. The resulting force causes the sealing ring to deflect primarily in the curved portions between ridge 34 and the thick marginal regions 27 and 28. The actual deflection is very small, the axial dimension between the sealing edge 25 and the edges 18, 20 being reduced in the order of only several thousandths of an inch in a typical installation. A fluid-pressure-tight barrier is formed in this manner between each sealing edge and the abutting surface adequate to prevent the passage of the fluid pressure.

Owing to the resilience of the seal, should the pressure applied to the seal operate to separate parts 12 and 14, the sealing ring can expand slightly to remain in sealing contact with surfaces 40 and 42. However, the pressure from source P-1 acts on the region of the convex side 24 between edge 25 and edge 20 in a manner tending to straighten or flatten this portion of the sealing ring to insure the tight sealing engagement of edges 25 and 20, notwithstanding the resilience of the ring. The same is true with respect to the force exerted by the pressure P-2 on the convex surface region of the sealing element between edge 25 and edge 18. The concave side 22 of the sealing ring remains substantially free from pressure. The mode of operation of the sealing element 10 is the same even though the pressure sources represented by P-1 and P-2 vary widely from one another.

The seal assembly may be repeatedly assembled and disassembled without necessarily damaging the sealing element.

Variations in the construction may be made within the scope of the claims.

I claim:

1. A seal assembly for static sealing service in fluid pressure equipment, said assembly comprising:
   (a) two parts having laterally spaced, opposing, plane parallel sealing surfaces mounted for displacement relatively toward each other;
   (b) an annular metallic sealing element between said sealing surfaces against which said parts are adapted to exert sealing pressure axially of said element, said element having:
   (c) an annular rigid resilient metal body having a central portion extending radially of the body with radially outer and radially inner curved end portions of uniform thickness which terminate in two radially spaced extremity portions which are thicker than said curved portions, and which project axially of the body to define a generally channel-shaped cross section for said body;
   (d) two annular line contact sealing edges on said body, one being on the thick radially outer extremity and the second being on the thick radially inner extremity, said sealing edges being disposed in a common plane normal to the axis of said sealing element and both being directed axially of the body and engaged with said sealing surface of one of said parts;
   (e) an annular ridge projecting from said central portion of said body on the side thereof opposite said thick extremities, said ridge being radially intermediate said two curved end portions of said body;
   (f) a third annular line contact sealing edge on said ridge directed axially of said sealing element opposite the aforesaid two sealing edges and engaged with said sealing surface of the other of said parts; and
   (g) said metal body of said sealing element being resiliently deflectable along the curved end portions of said body in response to an axial load provided by said two parts.

2. A seal assembly according to claim 1 wherein fluid pressure is directed between said two parts against the convex side of each of said curved end portions of said body.

References Cited

UNITED STATES PATENTS

| | | | |
|---|---|---|---|
| 3,139,009 | 6/1964 | Harting | 277—180 |
| 3,147,015 | 9/1964 | Hanback | 277—205 |

FOREIGN PATENTS

| | | |
|---|---|---|
| 44,867 | 2/1928 | Norway. |
| 278,092 | 9/1951 | Switzerland. |

LAVERNE D. GEIGER, *Primary Examiner.*

E. V. BENHAM, LEWIS J. LENNY, *Examiners.*

J. S. MEDNICK, *Assistant Examiner.*